(12) United States Patent
Matsumoto

(10) Patent No.: US 7,835,022 B2
(45) Date of Patent: Nov. 16, 2010

(54) GRID COMPUTING SYSTEM, AND JOB ALLOCATION METHOD IN GRID COMPUTING SYSTEM

(75) Inventor: Atsushi Matsumoto, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 1016 days.

(21) Appl. No.: 11/422,491

(22) Filed: Jun. 6, 2006

(65) Prior Publication Data

US 2006/0279777 A1    Dec. 14, 2006

(30) Foreign Application Priority Data

Jun. 9, 2005    (JP)    ............................. 2005-170042

(51) Int. Cl.
    *G06F 15/00*    (2006.01)
(52) U.S. Cl. .................................................. 358/1.15
(58) Field of Classification Search ............... 358/1.14, 358/1.15, 1.13, 1.18, 474, 402; 709/203, 709/207, 217, 224, 229
    See application file for complete search history.

(56) References Cited

U.S. PATENT DOCUMENTS

2002/0030840 A1*    3/2002    Itaki et al. .................. 358/1.13
2003/0184799 A1*    10/2003    Ferlitsch .................... 358/1.15
2005/0068562 A1*    3/2005    Ferlitsch .................... 358/1.14

FOREIGN PATENT DOCUMENTS

| JP | 10-162130 | | 6/1998 |
| JP | 11015802 A | * | 1/1999 |
| JP | 2004-046356 | | 2/2004 |
| JP | 2004-102931 | | 4/2004 |

OTHER PUBLICATIONS

Hiroshi Kashima; "Adaptability of Grid Computing to Commercial Systems",URLhttp://www-6.ibm.com/jp/provision/no36/pdf/36 ppr1.pdf; IBMProfessionals' Papers; ProVISION No. 36/Winter 2003 pp. 30-39 (with Abstract).

* cited by examiner

*Primary Examiner*—Saeid Ebrahimi Dehkordy
(74) *Attorney, Agent, or Firm*—Fitzpatrick, Cella, Harper & Scinto

(57) ABSTRACT

When distributed processing is to be performed in a computer system, a processing node subjected to the distributed processing is properly selected. For this purpose, when distributed processing is to be performed between a plurality of computer apparatuses which are connected via a network and include a management node (501) for requesting distributed processing of a job, and processing nodes (502*a* to 502*d*) for executing the requested distributed processing and transmitting processing results to the management node, the management node requests test processing of the processing nodes (1), receives the processing results from the processing nodes (2), updates status information in a database (503) in accordance with the received processing results of the test processing (3), and refers to the status information to select a processing node of which distributed processing is to be requested (4).

19 Claims, 7 Drawing Sheets

GRID COMPUTING SYSTEM, AND JOB ALLOCATION METHOD IN GRID COMPUTING SYSTEM

FIELD OF THE INVENTION

The present invention relates to a grid computing system and a job allocation method in the grid computing system and, more particularly, to job allocation in a grid computing system which performs distributed processing between a plurality of information processing apparatuses that are connected via a network and include a management node for requesting distributed processing of a job and processing nodes for executing the requested distributed processing and transmitting the processing results to the management node.

BACKGROUND OF THE INVENTION

Recently, grid computing (to be also simply referred to as "grid" hereinafter) which makes it possible to use a plurality of computers connected via a network as if they formed one system has attracted a great deal of attention. Applications of grid computing to various fields are attempted. For example, applications of grid computing are laid open to the public in an IBM professional's paper "Adaptability of grid computing to commercial systems"<URL: http://www6.ibm.com/jp/provision/no36/pdf/36_ppr1.pdf>.

FIG. 1 is a block diagram for explaining the architecture of grid computing. Although several types of grids are proposed, a so-called desktop grid which executes a job by using the idle time of the CPU of a desktop PC or the like will be described below.

In FIG. 1, a client 10 is a device for inputting a job as a request from the user. The input job is transferred to a task manager (to be simply referred to as a TM hereinafter) 20, and the TM 20 notifies a dynamic job scheduler (to be simply referred to as a DJS hereinafter) 30 of the contents of the job.

The DJS 30 manages the resources of host devices 41 to 43 each of which includes a broker 411 and a resource manager (to be referred to as an RM hereinafter) 412 and is recognized as a resource. The DJS 30 analyzes a job, selects the broker 411 of an optimal resource, and notifies the TM 20 of it. Note that the resource means the idle state of a CPU available in each host device.

The broker 411 registers resource information acquired by the RM 412 in the DJS 30, inputs a job to an optimal resource in accordance with a request from the TM 20, and notifies the TM 20 of the completion of the job at the end of the job.

The TM 20 inputs a job to an optimal broker 411 selected by the DJS 30, monitors the subsequent progress of the job, and when receiving a completion notification from the broker 411, notifies the client 10 of the result. If the resource changes or any problem occurs (for example, a failure or another job is accepted), the RM 412 notifies the broker 411 of this.

This mechanism implements the desktop grid by generally distributing a job to an idle resource such as a CPU and enabling distributed processing between a plurality of host devices while the user is not aware of it.

A configuration when this technique is applied to PDL processing in an image processing apparatus will be explained with reference to FIG. 2. In the description of FIG. 1, modules (DJS, broker, resource manager, and the like) which form the grid are distributed and exist in separate devices. When the gird is applied to a printing apparatus, a plurality of modules generally exist in one device.

FIG. 2 is a block diagram showing a configuration when grid computing is applied to PDL processing (expansion processing of a page description language into a raster image) in a printer. In the example shown in FIG. 1, modules which form the grid are treated as separate modules. When the gird is applied to an image forming apparatus such as a multi-function printer (MFP) or printer, a plurality of modules generally exist in one device.

In the configuration of FIG. 2, the user inputs a job such as a printing instruction from a client PC 110. The input job is analyzed by an image forming apparatus 120 (e.g., a printer) having the TM and DJS functions. Divided jobs as a result of the analysis are distributedly processed by grid computing using the resources of three PCs, i.e., PC 1 (141), PC 2 (142), and PC 3 (143) each having the broker and RM.

In the configuration shown in FIG. 2, the image forming apparatus 120 also functions as a host in grid computing. Needless to say, a PC other than the image forming apparatus 120 may function as a host.

When a PDL printing job is input from the client PC 110, the job is properly distributed and allocated to the resources of the PC 141 to 143 via the TM and DJS of the image forming apparatus 120. At the same time, an application program for expanding a PDL image is also transmitted from the image forming apparatus 120 to each PC.

Images formed by expanding the PDL in the respective PCs are transmitted to the image forming apparatus 120, collected, combined, and finally output from the image forming apparatus 120.

Note that the number of hosts subjected to distributed processing is not particularly limited, and may be three or more. A job may also be distributed and allocated to the resources of the client PC 110 and image forming apparatus 120.

Studies have been conducted to collect computer resources and implement high-speed processing using the grid computing technique. However, this technique is rarely applied to an embedded device.

When distributed processing to resources is to be performed, a system is constructed which includes a management node for requesting distributed processing of a job, and one or more processing nodes for receiving data of the requested distributed processing performing the processing, and sending back the results.

In general, the system is built on the assumption that all processing results obtained at a plurality of processing nodes are correct. When the computer resources of PCs or the like are used, the CPUs and OSs are often identical to each other, and processing results obtained from the processing nodes often coincide with each other.

However, in a distributed processing system using the resources (e.g., a CPU and image processing ASIC) of an embedded device such as the MFP, an environment where various types of MEPs coexist is assumed, and hardware resources (e.g., CPUs or image processing ASICS) used may be different between models.

As for software in addition to hardware resources, the numerical operation library, image processing operation module, or the like may be different in version.

If distributed processing is done using MEPs of different types, the processing result may change depending on the processing node. This decreases the reliability of the distributed processing result.

For example, a case wherein PDL processing is divided into pages and objects and distributedly executed will be examined. At this time, if the resolution of color processing is different between a given processing node and another processing node, the tint of pages processed by the given processing node may change, or the tint of objects in pages processed by the given processing node may become different from that of other objects. As a result, the image quality of the processing result decreases, and the reliability of the distributed processing system is impaired.

Even if processing nodes are different in model or the version of software or hardware, they may be designed with a common platform. In some cases, even different models provide the same processing result, or the difference does not influence the processing results of distributed processing. It is difficult to determine, on the basis of simply the model name or the version of software or hardware, whether processing results are different. If a processing node is selected as a distributed processing request destination on the basis of these pieces of information, the number of processing nodes subjected to distributed processing decreases, and the efficiency of the distributed processing system decreases.

Also when a processing node at which information is tampered or data degrades exists among processing nodes in the distributed processing system using the CPU resources of PCs, the reliability of the distributed processing system is impaired.

SUMMARY OF THE INVENTION

The present invention has been made in consideration of the above situation, and has as its object to increase the reliability and efficiency of an information processing system by appropriately selecting processing nodes to which distributed processing is allocated when the distributed processing is executed in the information processing system.

As a means for achieving the above object, the present invention comprises the following arrangement.

That is, a grid computing system which performs distributed processing between a plurality of information processing apparatuses connected via a network; wherein the plurality of information processing apparatus include a management node which requests distributed processing of a job, and processing nodes which execute the requested distributed processing and transmit processing results to the management node; and the management node selects processing nodes of which distributed processing is to be requested, which has determined to have substantially the same ability of each other on the basis of processing results of test processing requested.

With this configuration, processing nodes which provide desired results, and other processing nodes can be identified from processing results of test processing. A group of processing nodes which provide desired results can be selected to request distributed processing of it.

Processing nodes subjected to distributed processing can be appropriately selected, and it is prevented to request distributed processing of processing nodes which cannot provide any desired result. Hence, the reliability and efficiency of the distributed processing system increase.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

The accompanying drawings, which are incorporated in and constitute a part of the specification, illustrate embodiments of the invention and, together with the description, serve to explain the principles of the invention.

DETAILED DESCRIPTION OF THE PREFERRED EMBODIMENTS

Preferred embodiments of the present invention will be illustratively described in detail below with reference to the accompanying drawings. However, building components described in the following embodiments are merely an example, and the scope of the present invention is not limited to them.

First Embodiment

In the first embodiment, a grid computing system is built by a plurality of image processing apparatuses. The image processing apparatuses which form the system are connected to each other via an intercommunicable interface.

In the grid computing system according to the first embodiment, one image processing apparatus operates as a management node for requesting distributed processing, and the remaining image processing apparatuses operate as processing nodes for receiving a job of distributed processing, performing the processing, and sending back the results to the management node. That is, the TM and DJS are installed in one image processing apparatus operating as the management node, and the broker and RM are installed in the remaining image processing apparatuses operating as processing nodes subjected to distributed processing.

(Hardware Configuration of Image Forming Apparatus)

Figure 1:
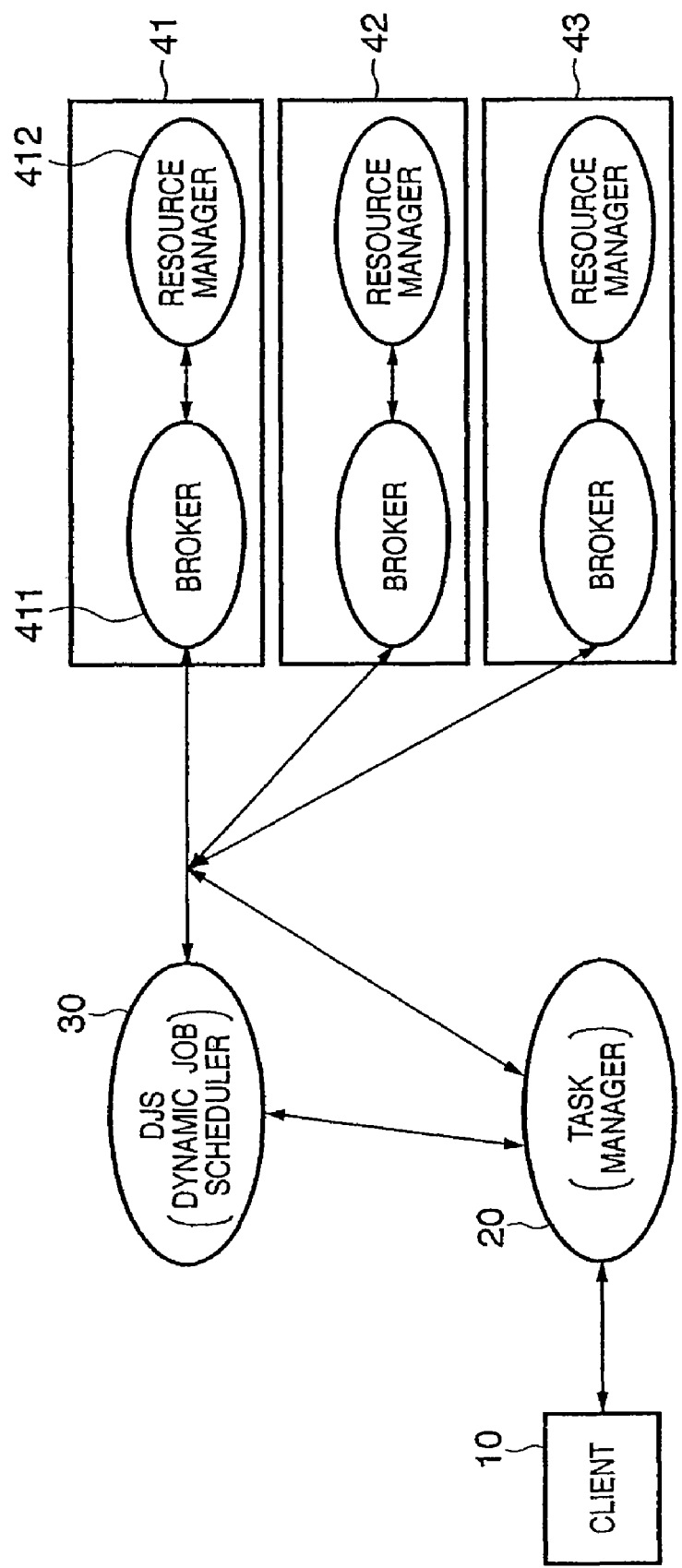
FIG. 1 is a block diagram showing the basic architecture of grid computing.
Figure 2:
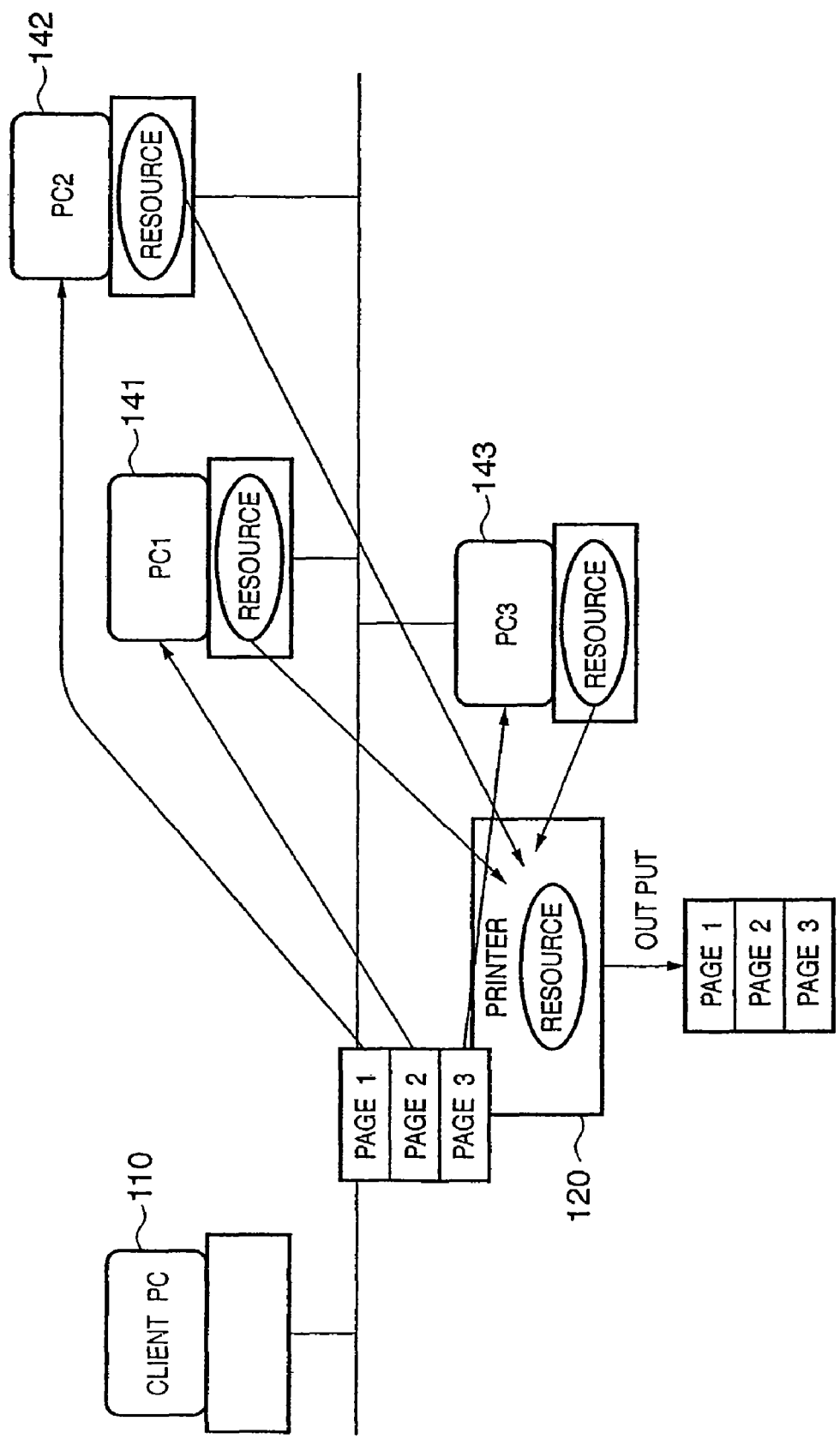
FIG. 2 is a block diagram showing an example when grid computing is applied to PDL processing in a printer.
Figure 3:
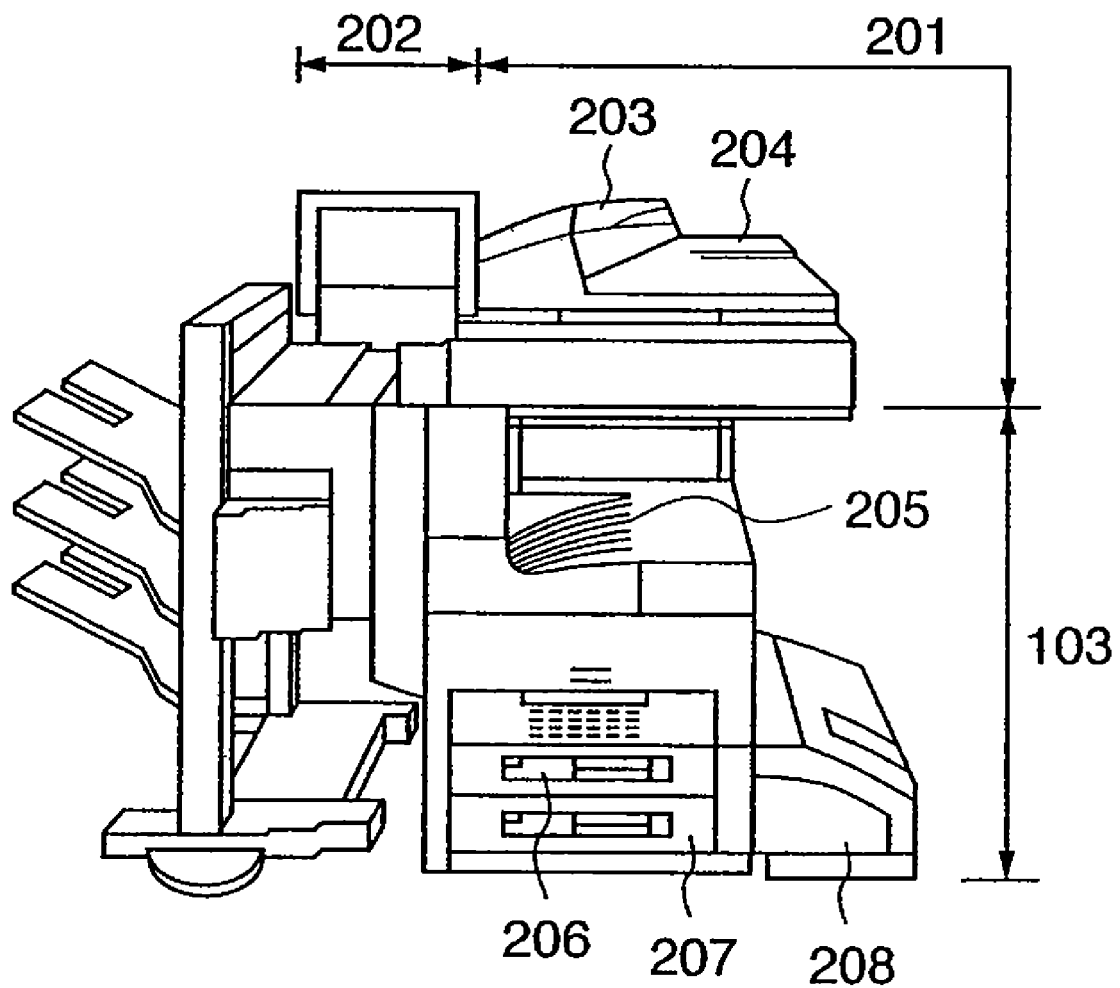
FIG. 3 is a view showing the outer appearance of an image forming apparatus according to the present invention.

FIG. 3 is a view showing the outer appearance of an image forming apparatus as an embodiment of an image processing apparatus which forms grid computing (to be also simply referred to as "grid" hereinafter) according to the present invention. The image forming apparatus according to the first embodiment is a multi-function printer (MFP) having the scanner function, copying function, and printing function, and is connected to a network.

A scanner 201 serving as an image input device illuminates an image on document paper, scans a CCD line sensor (not shown), and thereby generates raster image data.

The controller CPU of the image forming apparatus accepts a read operation start instruction from the user via an operation unit 202 while document printing materials are set on a tray 203 of a document feeder 204. Then, the controller CPU of the image forming apparatus issues an instruction to the scanner 201. The feeder 204 feeds the document printing materials one by one, and the scanner 201 reads the document images.

The operation unit 202 is a user interface for designating settings and displaying the status in a copying operation, and designating various operation settings. The operation unit 202 comprises a touch panel type operation panel.

A printer engine 103 serving as an image output device prints raster image data on a printing material. Examples of the printing method are electrophotography using a photosensitive drum and photosensitive belt, and an inkjet method of discharging ink from a small nozzle array to directly print an image on a printing material. However, any printing method can be adopted. Note that the printing operation starts in response to an instruction from the controller CPU.

The printer engine 103 has a plurality of feed stages, and comprises corresponding printing material cassettes 206, 207, and 208 so that different printing material sizes or different printing material orientations can be selected. A delivery tray 205 receives a printed material.

Figure 4:
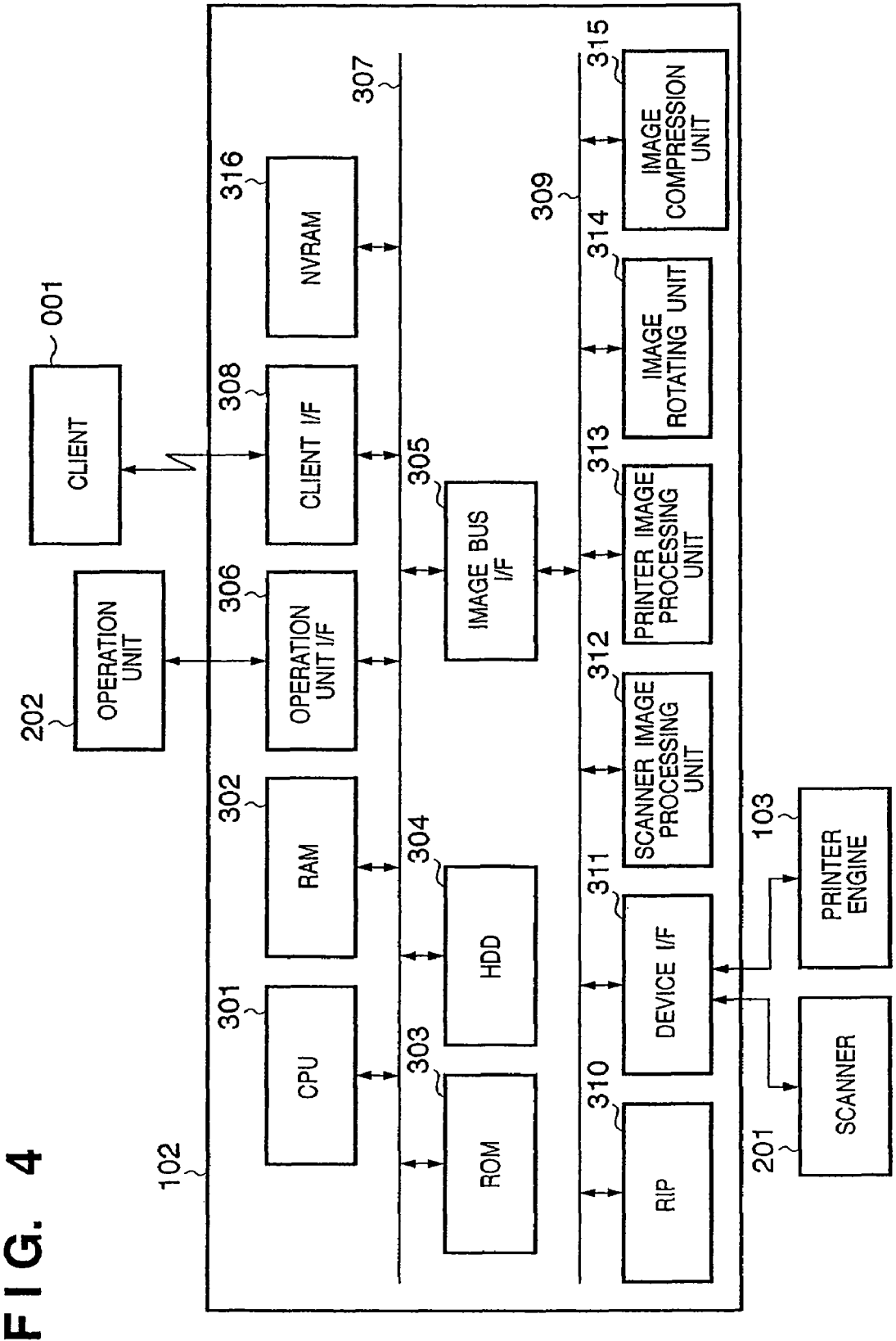
FIG. 4 is a block diagram showing the control configuration of the image forming apparatus in FIG. 3.

FIG. 4 is a block diagram showing the control configuration of the image forming apparatus according to the first embodiment. A printer controller 102 is connected to the scanner 201 serving as an image input device and the printer engine 103 serving as an image output device. The printer controller 102 inputs/outputs printing data, image information, and device information from/to a client 001 via a client I/F 308.

A CPU 301 is a controller which controls the overall system. A RAM 302 is a system work memory used to operate the CPU 301. The RAM 302 is also an image memory for temporarily storing image data. A ROM 303 is a boot ROM which stores the boot program of the system. An HDD 304 is a hard disk drive which stores system software and image data.

An operation unit I/F 306 is an interface with the operation unit (UI) 202. The operation unit I/F 306 outputs, to the operation unit 202, image data to be displayed on the operation unit 202. Further, the operation unit I/F 306 notifies the CPU 301 of information input from the user via the operation unit 202. Environment setting information such as an operation mode input from the operation unit 202 is stored in an NVRAM 316 serving as a nonvolatile memory.

The client I/F 308 inputs/outputs information to/from each client. The above-described devices are arranged on a system bus 307.

An image bus interface (I/F) 305 is a bus bridges which connects the system bus 307 and an image bus 309 for transferring image data at high speed, and converts the data structure.

The following devices are arranged on the image bus 309. A raster image processor (RIP) 310 expands a PDL code transmitted from the network into a bitmap image. A device I/F 311 connects the printer controller 102 to the scanner 201 and printer engine 103 serving as image input/output devices, and performs synchronous/asynchronous conversion of image data.

A scanner image processing unit 312 corrects, processes, and edits input image data. A printer image processing unit 313 performs various correction processes, resolution conversion, and the like for printout image data. An image rotation unit 314 rotates image data. An image compression unit 315 compresses/decompresses multilevel image data by JPEG and binary image data by JBIG, MMR, or MH.

Image forming apparatuses having the above configuration according to the first embodiment are connected to each other via the client interface (e.g., a intercommunicable network interface such as Ethernet®) 308, and operate as a computer system which performs load-distributed processing by grid computing.

(Processing Node Selection Method)

The grid computing system according to the first embodiment is made up of a plurality of image processing apparatuses having the above configuration. The management node which requests load-distributed processing using the grid computing system selects processing nodes subjected to the load-distributed processing on the basis of the information and statuses of other image processing apparatuses that are registered in advance in a processing node status database.

Figure 5:
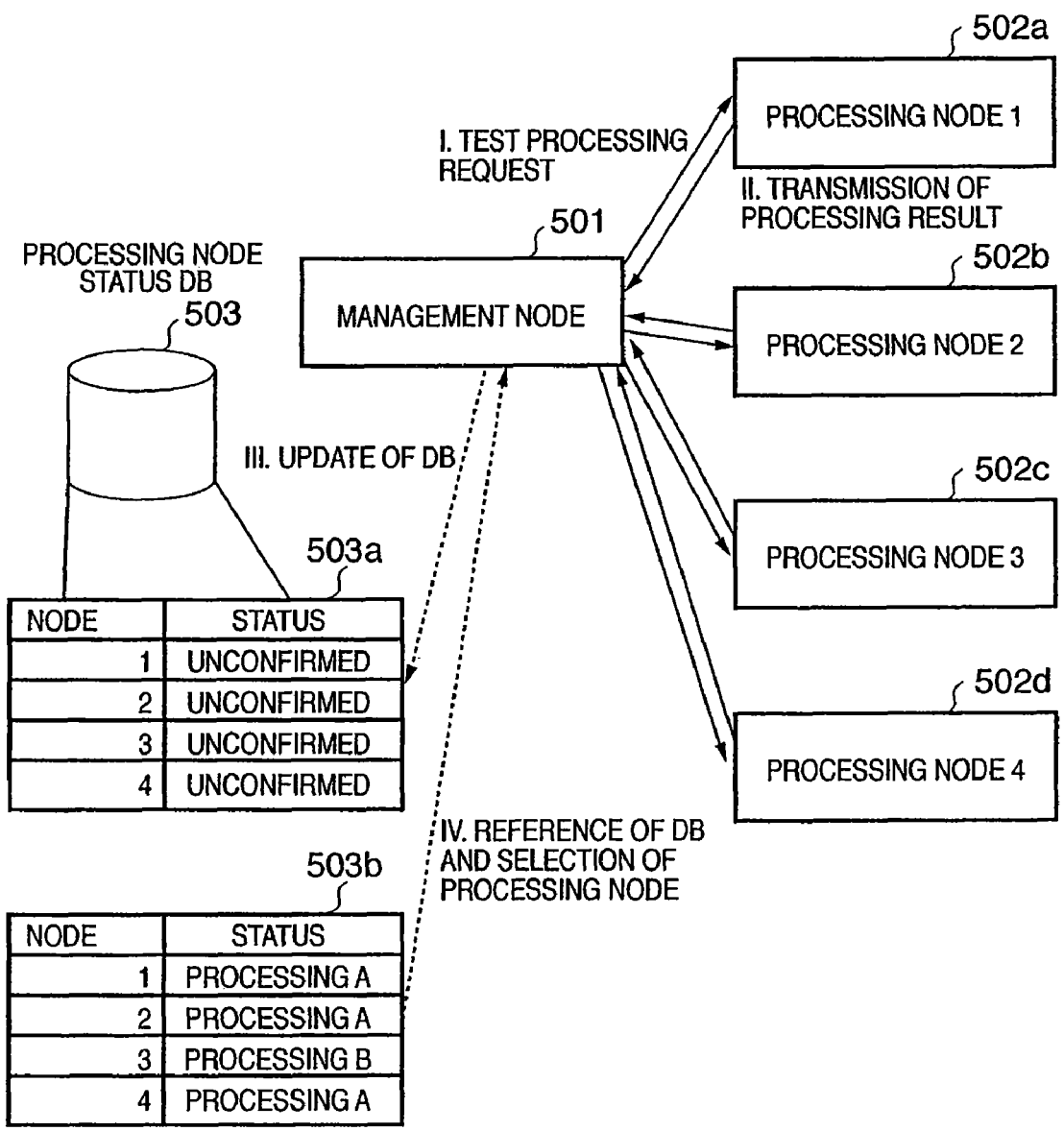
FIG. 5 is a block diagram schematically showing the configuration and processing order of the first embodiment.

FIG. 5 is a block diagram schematically showing the configuration and processing order of the first embodiment. In FIG. 5, reference numeral 501 denotes a management node; 502a to 502d, four processing nodes 1 to 4, respectively; 503, a processing node database (DB); and 503a and 503b, examples of information stored in the processing node status database 503 in respective statuses.

The processing node status DB is arranged in one of image processing apparatuses which form the grid in the first embodiment, but may be arranged in an independent computer apparatus.

In the first embodiment, processing node selection processing based on information in the processing node status DB 503 is executed in accordance with a processing flow represented by (1) to (4) in FIG. 5.

(1) The management node 501 manages information (to be also referred to as status information) in the processing node status DB 503 that represents whether each processing node is available. That is, the management node 501 writes, in the processing node status DB 503, status information of each processing node before requesting a job and after receiving a processing result. The information 503a represents an example of pieces of status information of the processing nodes 502a to 502d before a job is requested after system setup. All the pieces of status information of processing nodes 1 to 4 are "unconfirmed".

The management node 501 requests test processing whose prepared processing result is known, of the processing nodes 502a to 502d whose status information is "unconfirmed". This processing is a test, unlike normal distributed processing, and test processes sent to the processing nodes are identical. In this case, the test processing is requested of all the four processing nodes. The test processing contains, e.g., data of the processing unit, and can be completed within a short time by each processing node without increasing the load.

A processing result (to be also simply referred to as a "criterion" hereinafter) serving as a criterion to determine whether each processing node is subjected to load-distributed processing is prepared for the test processing. For example, a result obtained by executing the test processing by the management node 501 may be used as the criterion.

(2) Upon reception of the test processing, the processing nodes 502a to 502d perform the processing, and transmit the processing results to the management node 501.

(3) Upon reception of the processing results from the processing nodes, the management node 501 compares each processing result with the criterion, and updates the contents of the processing node status DB 503 so that status information of a processing node which sent back the same processing result is changed to "available" and that of a processing node which sent back a processing result different from the criterion is changed to "unavailable".

This example assumes that a processing result received from processing node 3 is different from the criterion, and processing results received from processing nodes 1, 2, and 4 coincide with the criterion. In this case, the status information in the processing node status DB 503 is updated as represented by the information 503b to change status information of processing node 3 to "unavailable" and pieces of status information of the remaining processing nodes to "available".

(4) When a job is distributedly processed by the grid, the management node 501 refers to the processing node status DB 503, selects processing nodes (502a, 502b, and 502d) whose status information is "available", and requests distributed processing of them.

This operation will be described by a concrete example. Assume that processing nodes 1, 2, and 3 are MFPs of model A, and processing node 4 is an MFP of model B. The type of processing to be requested is color processing, and color processing software is installed in each processing node. The MFP of processing node 3 is model A, but the version of the color processing software is C because the software is installed earlier than those in the MFPs of processing nodes 1 and 2. In the MFPs of processing nodes 1, 2, and 4, the version of the installed color processing software is D. The MFP of processing node 4 is model B, which is different from the model of the remaining processing nodes.

In this case, neither the hardware resource nor software resource of the MFP configuration depends on only the model, and the same resource is often installed as a common design (platform) in even different modules. Even if the models of MFPs are the same, versions of software in the MFPs may be different from each other due to a minor change, and the processing result may change depending on whether the software is upgraded. Even if versions of software or hardware in the MFPs are different from each other, the same processing result may be obtained depending on the contents of a requested job. In many cases, whether the same (or almost the same) processing result is obtained cannot be determined from only information such as the model name or the version of a software resource or hardware resource.

In the first embodiment, each processing node is caused to execute test processing including the same processing as a job to be requested. A processing node whose processing result coincides with the criterion is selected as a distributed processing request destination, increasing the reliability of the processing result. Further, it is prevented to exclude, from processing targets on the basis of information on the model name or resource, a processing node which can be actually subjected to distributed processing without any problem. Hence, the efficiency of the distributed processing system can increase.

In the above example, processing node 3 has a different version of the color processing software for use, exhibits a processing result different from those of the remaining processing nodes, and is excluded from distributed processing targets. This increases the reliability of the result obtained by distributed processing.

When a processing node subjected to distributed processing is selected on the basis of only the model name, processing node 4 is excluded from distributed processing targets, but the first embodiment can prevent this. For example, when processing nodes are selected on the basis of the model name in distributedly processing a color conversion job of three pages, color conversion processing of the respective pages is requested of processing nodes 1 to 3. In this case, only a page processed by processing node 3 has a different tint. To the contrary, according to the first embodiment, processing node 3 is excluded from distributed processing targets, processing node 4 is subjected to distributed processing instead, and all the three pages have the same (or almost the same) tint.

In the grid configuration according to the first embodiment, only one predetermined image processing apparatus may serve as the management node, as described above. Image processing apparatuses can also operate as management nodes for requesting distributed processing, and can also operate as processing nodes for receiving distributed processing, executing the processing, and sending back the results. The management node may be dynamically switched in accordance with the state of the overall system.

In the above embodiment, a processing node having the same result of test processing as a processing result serving as the criterion is subjected to distributed processing. In some cases, however, coincidence with the processing result serving as the criterion is not so required depending on the type of job to be distributedly processed, its contents (processes contained in the job), or a user who requests distributed processing.

In this case, for example, status information of a processing node at which an error or difference from the processing result serving as the criterion falls within a predetermined range or the precision or specification of a processing result is equal to or higher than that of the processing result serving as the criterion is set "available", and the processing node is selected as a distributed processing target. The criterion is set by the administrator at the management node.

Second Embodiment

The second embodiment according to the present invention will be described below. The second embodiment is also related to a grid computing system built by a plurality of image forming apparatuses, similar to the first embodiment. A description of the same part as that in the first embodiment will be omitted, and a characteristic part of the second embodiment will be mainly explained.

In the grid computing system of the second embodiment, one image processing apparatus operates as a management node for requesting distributed processing and a processing node for executing the distributed processing, and the remaining image processing apparatuses operate as processing nodes for executing the distributed processing. In other words, the TM, DJS, broker, and RM are installed in one image processing apparatus operating as a management node and processing node. The broker and RM are installed in the remaining image processing apparatuses operating as processing nodes.

Figure 6:
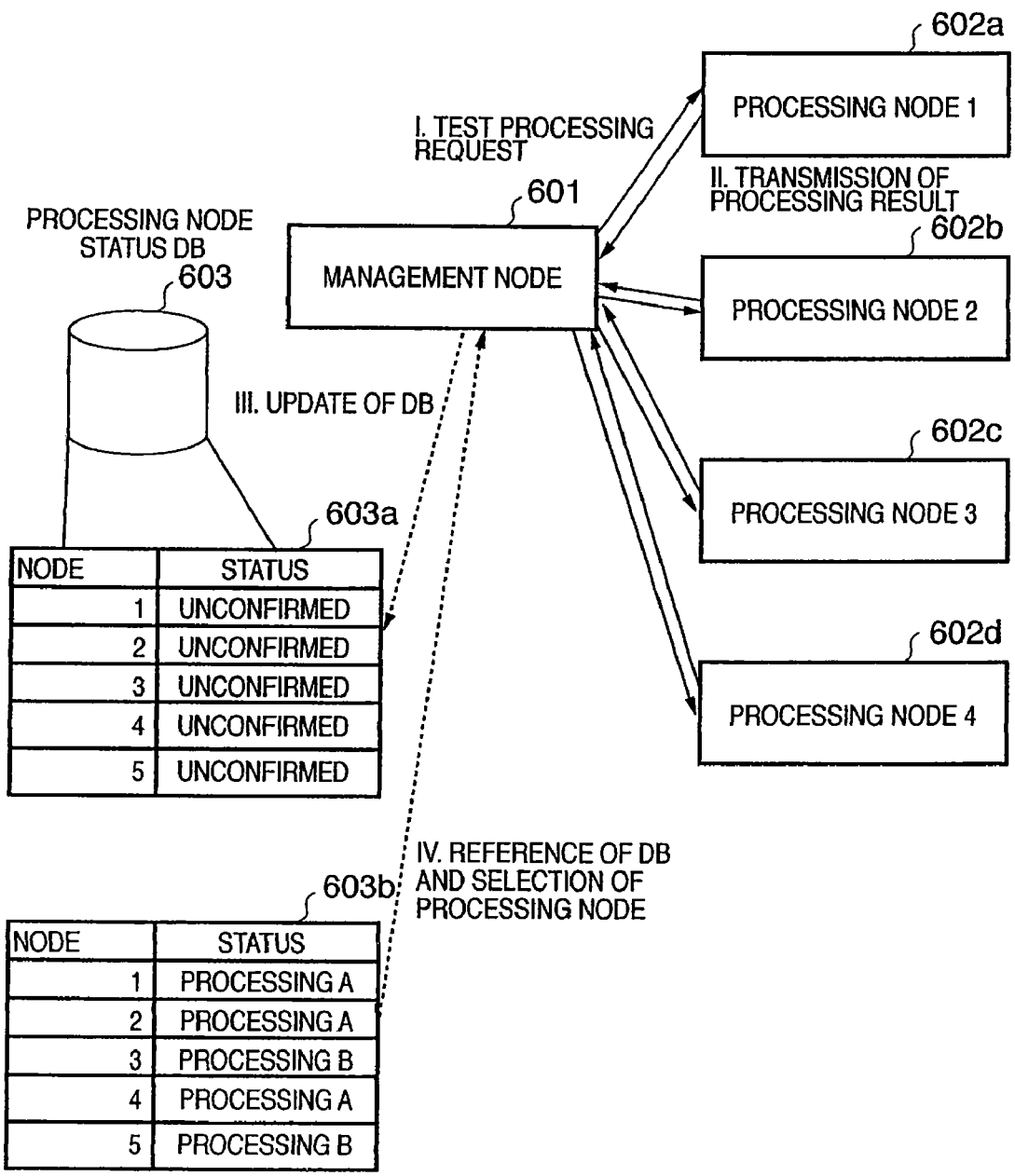
FIG. 6 is a block diagram schematically showing the configuration and processing order of the second embodiment.

FIG. 6 is a block diagram showing the configuration and processing order of the second embodiment, similar to FIG. 5. In FIG. 6, reference numeral 601 denotes a management node which also serves as a processing node subjected to distributed processing and is also called processing node 5. Reference numerals 602a, 602b, 602c, and 602d denote processing nodes 1, 2, 3, and 4, respectively; 603, a processing node database (DE); and 603a and 603b, examples of information stored in the processing node status database 603 in respective statuses.

The second embodiment is greatly different from the first embodiment in that in the second embodiment, processing whose result is unknown is adopted as test processing to be executed at each processing node, and a processing node subjected to distributed processing is selected on the basis of the comparison between processing results received from processing nodes.

In the second embodiment, processing node selection processing based on information in the processing node status DB 603 is executed in accordance with a processing flow represented by (1) to (4) in FIG. 6.

(1) The management node 601 manages status information of each processing node in the processing node status DB 603. That is, the management node 601 writes status information of each processing node before requesting a job and after receiving a processing result. The information 603a represents an example of pieces of status information of processing nodes 1 to 5 before a job is requested after system setup. All the pieces of status information of processing nodes 1 to 5 are "unconfirmed".

The management node 601 requests test processing whose prepared processing result is unknown, of processing nodes 1 to 5 whose status information is "unconfirmed". This request is to conduct a test, unlike a normal distributed processing request, and test processes sent to the processing nodes are identical. In the second embodiment, the management node 601 itself also serves as a processing node, and the processing is requested of all the five processing nodes including processing node 5.

(2) Upon reception of the test processing, processing nodes 1 to 5 perform the processing, and transmit the processing results to the management node 601.

(3) Upon reception of the processing results from the processing nodes, the management node 601 compares the processing results transmitted from the processing nodes, and writes the same status in status information of the processing node status DB 603 for processing nodes which sent back the same processing result.

This example assumes that processing results received from processing nodes 1, 2, and 4 are identical (first processing result), and processing results received from processing nodes 3 and 5 are identical (second processing result). In this case, the management node 601 updates the processing node status DB by writing "processing A" as status information of processing nodes 1, 2, and 4 and "processing B" as status information of processing nodes 3 and 5.

(4) When a job is distributedly processed by the grid, the management node 601 refers to the processing node status DB 603, and selects, as a distributed processing target, a group containing a larger number of processing nodes having the same processing result. The management node 601 requests distributed processing of an input job of the selected group.

In this example, as represented by the information 603b, three processing nodes have the status information "processing A", and two processing nodes have the status information "processing B". Hence, in this example, processing nodes 1, 2, and 4 having the status information "processing A" are selected as distributed processing targets, and distributed processing is requested of them. Processing node 5 is the management node 601 itself which inputs a job, but is not selected as a distributed processing target because status information of processing node 5 is "processing B". This is because the efficiency of distributed processing is increased by selecting a group containing a larger number of processing nodes subjected to distributed processing.

Note that it is sometimes convenient to perform processing by the management node 601 itself. Not only a group containing a larger number of processing nodes is simply selected, but also a group of processing nodes having the same status information as that of the management node may be selected as a distributed processing target in accordance with processing contents. It is important to select processing nodes having the same processing results as distributed processing targets.

As described above, according to the second embodiment, processing nodes are caused to execute test processing whose result is unknown, and status information is written in the processing node status DB so that processing nodes having the same (or almost the same) processing result can be identified. A group of processing nodes exhibiting the same test processing result is selected as a distributed processing target, increasing the reliability and efficiency of the distributed processing system. The above-mentioned criterion for "almost the same" is set by the administrator at the management node.

Third Embodiment

The third embodiment according to the present invention will be described below. The third embodiment is also related to a grid computing system built by a plurality of image forming apparatuses, similar to the first and second embodiments. A description of the same part as those in the first and second embodiments will be omitted, and a characteristic part of the third embodiment will be mainly explained.

In the grid computing system of the third embodiment, similar to the second embodiment, one image processing apparatus operates as a management node for requesting distributed processing and a processing node for executing the distributed processing, and the remaining image processing apparatuses operate as processing nodes for executing the distributed processing.

Figure 7:
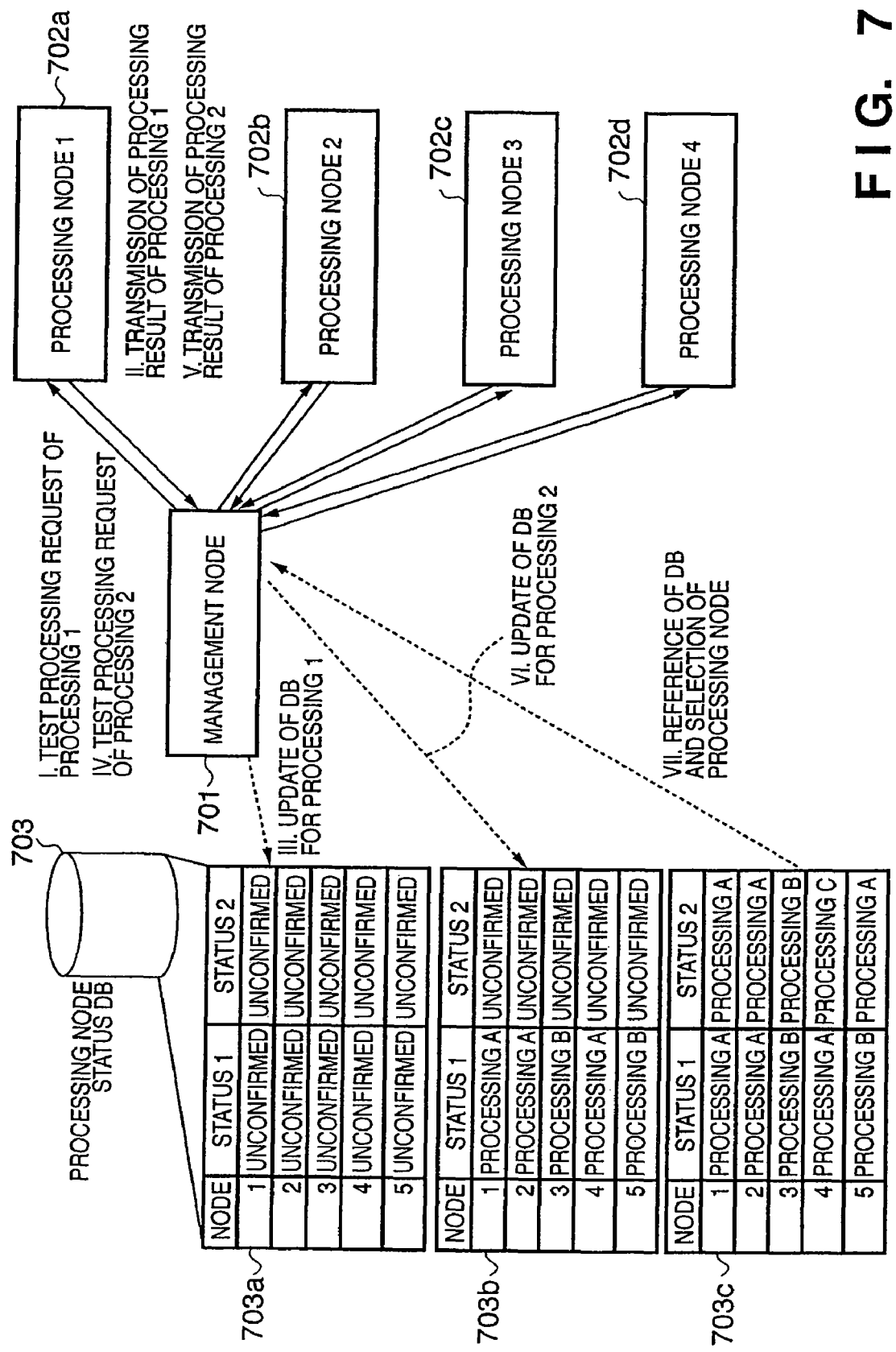
FIG. 7 is a block diagram schematically showing the configuration and processing order of the third embodiment.

FIG. 7 is a block diagram showing the configuration and processing order of the third embodiment, similar to FIGS. 5 and 6. In FIG. 7, reference numeral 701 denotes a management node which also serves as a processing node subjected to distributed processing and is also called processing node 5. Reference numerals 702a, 702b, 702c, and 702d denote processing nodes 1, 2, 3, and 4, respectively; 703, a processing node database (DB); and 703a, 703b, and 703c, examples of information stored in the processing node status database 703 in respective statuses.

The third embodiment is different from the first and second embodiments in that the processing node status DB 703 stores, as status information, pieces of status information corresponding to processing types. A case wherein the processing node status DB 703 has two pieces of status information will be exemplified, but the number of pieces of status information may be two or more or status information may be added later.

Test processing employed in the third embodiment may be one whose processing result is known, similar to the first embodiment, or one whose processing result is unknown, similar to the second embodiment. In the following description, the processing result is unknown.

In the third embodiment, processing node selection processing based on information in the processing node status DB 703 is executed in accordance with a processing flow represented by (1) to (7) in FIG. 7.

(1) The management node 701 manages status information of each processing node in the processing node status DB 703 for each job type. That is, when there are types of jobs to be distributedly processed, the management node 701 causes each processing node to execute test processing corresponding to each type, and writes status information on the basis of the result of each test processing. In the following example, the processing node status DB 703 has two types of status information corresponding to processing 1 which is test processing corresponding to PDL color processing, and processing 2 which is test processing corresponding to copying image processing.

The information 703a represents an example of pieces of status information of processing nodes 1 to 5 before a job is requested after system setup. All the pieces of status information of processing nodes 1 to 5 are "unconfirmed" for both processing 1 and processing 2.

The management node 701 requests test processing 1 whose prepared processing result is unknown, of processing nodes 1 to 5 whose corresponding status information is "unconfirmed". This request is to conduct a test, unlike a normal distributed processing request, and test processes 1 sent to the processing nodes are identical. In the third embodiment, the management node 701 itself also serves as a processing node, and the processing is requested of all the five processing nodes including processing node 5.

(2) Upon reception of test processing 1, processing nodes 1 to 5 perform the processing, and transmit the processing results to the management node 701.

(3) Upon reception of the processing results from the processing nodes, the management node 701 compares the processing results of processing 1 that are transmitted from the processing nodes, and writes the same status in status information in the column of status 1 corresponding to processing 1 in the processing node status DB 703 for processing nodes which sent back the same processing result.

This example assumes that processing results received from processing nodes 1, 2, and 4 are identical (first processing result), and processing results received from processing nodes 3 and 5 are identical (second processing result). In this case, the management node 701 updates the processing node status DB by writing "processing A" as status information of processing nodes 1, 2, and 4 in status 1 and "processing B" as status information of processing nodes 3 and 5 in status 1. The information 703b represents a state after the column of status 1 is updated.

(4) The management node 701 requests test processing 2 whose prepared processing result is unknown, of processing nodes 1 to 5 for which the status information column of status 2 is "unconfirmed". This request is also to conduct a test, unlike a normal distributed processing request, and test processes sent to the processing nodes are identical. In the third embodiment, the management node 701 also serves as processing node 5, and processing 2 is requested of all the five processing nodes including processing node 5.

(5) Upon reception of test processing 2, the processing nodes perform the processing, and transmit the processing results to the management node 701.

(6) Upon reception of the processing results from the processing nodes, the management node 701 compares the processing results of processing 2 that are transmitted from the processing nodes, and writes the same status in status information in the column of status 2 corresponding to processing 2 in the processing node status DB 703 for processing nodes which sent back the same processing result.

This example assumes that processing results received from processing nodes 1, 2, and 5 are identical (first processing result), and processing results received from processing nodes 3 and 4 are different (second and third processing results). In this case, the management node 701 updates the processing node status DB 703 by writing "processing A" in fields corresponding to processing nodes 1, 2, and 5 in the column of status 2 in the processing node status DB, "processing B" in a field corresponding to processing node 3, and "processing C" in a field corresponding to processing node 4. The information 703c represents a state after the column of status 2 is updated.

It should be noted that "processing A", "processing B", and "processing C" written in the column of status 2 are merely expressions (signs) for identifying processing results in status 2, and are different from "processing A" and "processing B" which are pieces of status information in the column of status 1.

(7) When a job is distributedly processed by the grid, the management node 701 refers to the processing node status DB 703, and selects, as a distributed processing target, a group containing a larger number of processing nodes having the same processing result in consideration of the result of test processing similar to the job. The management node 701 requests distributed processing of an input job of the selected group.

For example, when the job is PDL color processing similar to processing 1 and priority is given to the processing speed (efficiency), the job is distributed to processing nodes 1, 2, and 4 to request the processing of them. When the same processing result as that of the management node is desired, the job may be distributed to processing nodes 5 and 3 to request the processing of them.

When the job is copying image processing similar to processing 2, the job is distributed to processing nodes 1, 2, and 5 having the same processing result to request the processing of them. In this case, distributed processing is requested of processing nodes except the remaining processing nodes 3 and 4 having different processing results, so the processing result becomes reliable.

As described above, according to the third embodiment, processing nodes are caused to execute tests corresponding to different processes, and status information based on each test result is also stored in the processing node status DB. A proper processing node can be selected in accordance with the type of job to be distributedly processed. Consequently, the reliability and efficiency of the distributed processing system can be increased.

Modification 1

In the first to third embodiments, test processing is requested of each processing node separately from a job which actually requests distributed processing. Alternatively, test processing may be contained in a job which requests distributed processing.

In this case, all processing nodes in the system are subjected to distributed processing. Whether to adopt an obtained distributed processing result is determined on the basis of the result of test processing. At the same time, status information corresponding to the result of test processing is stored in the processing node status DB. Processing requested of a processing node whose distributed processing result is determined not to be adopted is requested again of another processing node whose distributed processing result is determined to be adopted.

Note that distributed processing which targets all processing nodes in the system may not be executed for all jobs but may be executed every time a predetermined time elapses.

This configuration can increase the reliability and efficiency of the distributed processing system even when a work which changes status information of a processing node, for example, upgrade of software or firmware is done after status information in the processing node status DB is updated.

Modification 2

In the first to third embodiments, a processing node is selected as a job allocation target in accordance with status information after status information is written in the processing node status DB on the basis of the test processing result.

Although the above embodiments have not particularly described update of status information, status information must be updated when a work which changes status information of a processing node, for example, upgrade of software or firmware is done.

Status information may be updated by, for example, automatically performing test processing in the embodiments every predetermined period.

This configuration can increase the reliability and efficiency of the distributed processing system without increasing the load in an actual job request even when software or firmware is upgraded.

Other Embodiment

In the above-described embodiments, the grid control program is installed in the image forming apparatus. Instead, elements which form the grid may be independently installed in the server and other PCs.

The above embodiments have described an example using the grid computing technique. However, the present invention can be similarly applied to an apparatus which is configured to execute processing requested by another apparatus connected via a network, for example, to execute processing requested from another device on the background (e.g., to execute service software from a PC connected to an MFP via a LAN or download firmware).

The present invention may be applied to a grid computing system (grid network) built by a plurality of devices, or one device which forms a grid network.

Note that the present invention is also achieved by supplying a software program (in the above embodiments, programs corresponding to the processing flows shown in FIGS. 5 to 7 for implementing the functions of the above-described embodiments to a system or apparatus directly or from a remote place, and reading out and executing the supplied program codes by the computer of the system or apparatus. In this case, the form of the present invention need not be a program as far as a program function is obtained.

The present invention is therefore implemented by program codes installed in the computer in order to implement functional processing of the present invention by the computer. That is, claims of the present invention include a computer program itself for implementing functional processing of the present invention.

In this case, the form of the program is arbitrary such as an object code, a program executed by an interpreter, or script data supplied to an OS as far as a program function is obtained.

A recording medium for supplying the program includes a flexible disk, hard disk, optical disk, magnetooptical disk, MO, CD-ROM, CD-R, CD-RW, magnetic tape, nonvolatile memory card, ROM, and DVD (DVD-ROM and DVD-R).

As another program supply method, the program can be supplied by connecting a client computer to an Internet Web page via the browser of the client computer, and downloading the computer program of the present invention or a compressed file containing an automatic installing function from the Web page to a recording medium such as a hard disk. The program can also be implemented by grouping program codes which form the program of the present invention into a plurality of files, and downloading the files from different Web pages. That is, the present invention also includes a WWW server which allows a plurality of users to download the program files for implementing functional processing of the present invention by a computer.

The program of the present invention can be encrypted, stored in a storage medium such as a CD-ROM, and distributed to the user. A user who satisfies predetermined conditions is prompted to download decryption key information from a Web page via the Internet. The user executes the encrypted program by using the key information, and installs the program in the computer.

The functions of the above-described embodiments are implemented when the computer (information processing apparatus) executes the readout program. Also, the functions of the above-described embodiments are implemented when an OS or the like running on the computer performs part or all of actual processing on the basis of the instructions of the program.

The functions of the above-described embodiments are implemented when the program read out from the recording medium is written in the memory of a function expansion board inserted into the computer or the memory of a function expansion unit connected to the computer, and the CPU of the function expansion board or function expansion unit performs part or all of actual processing on the basis of the instructions of the program.

As many apparently widely different embodiments of the present invention can be made without departing from the spirit and scope thereof, it is to be understood that the invention is not limited to the specific embodiments thereof except as defined in the claims.

This application claims the benefit of Japanese Application No. 2005-170042, filed Jun. 9, 2005, which is hereby incorporated by reference herein in its entirety.

What is claimed is:

1. A distributed processing system that performs distributed processing, the system comprising:
a plurality of information processing apparatuses connected via a network, wherein the plurality of information processing apparatuses includes:
a management node, which requests distributed processing of a job, and
processing nodes, each node of a subset of which is to perform processing of a unique part of the job and to transmit a processing result to the management node, wherein the management node includes:
a grouping unit, which requests the processing nodes to perform a test processing different from the distributed processing of the job, and which groups, based on processing results of the test processing received from the processing nodes, the subset of the processing nodes as a group of processing nodes of which performance of the distributed processing of the job is to be requested; and
a requesting unit, which requests the group of processing nodes to perform the distributed processing of the job.

2. The distributed processing system according to claim 1, further comprising a processing node status database, which stores status information on the processing results of the test processing received from the processing nodes, wherein,
when the status information is updated in accordance with the processing results of the test processing and the distributed processing of a the job is requested, the management node selects a processing node of which performance of the distributed processing of the job is to be requested, based on the status information.

3. The distributed processing system according to claim 2, wherein
a processing result serving as a criterion for the test processing is known, and
the status information includes information based on whether a processing result of the test processing coincides with the processing result serving as the criterion.

4. The distributed processing system according to claim 3, wherein the management node selects, as a processing node of which performance of the distributed processing of the job is to be requested, a processing node having a processing result of the test processing that is the same as the criterion.

5. The distributed processing system according to claim 2, wherein the processing node status database stores status information on a plurality of processing results for each processing node corresponding to respective types of jobs to be distributedly processed.

6. The distributed processing system according to claim 2, wherein,
when a processing node does not execute the test processing, the processing node status database stores, as the status information, information representing that the processing node does not execute the test processing before requesting performance of the distributed processing of the job by the processing node.

7. The distributed processing system according to claim 2, wherein the management node requests performance of the test processing by each processing node every predetermined period, and updates the status information.

8. The distributed processing system according to claim 1, wherein the grouping unit compares the processing results of the test processing received from the processing nodes, and groups the subset of the processing nodes based on a comparison result and not on a predetermined criterion.

9. The distributed processing system according to claim 8, wherein the management node selects, as a processing node of which performance of the distributed processing of the job is to be requested, a processing node belonging to a group containing a largest number of processing nodes among groups of processing nodes having a same processing result of the test processing.

10. The distributed processing system according to claim 8, wherein the management node selects, as a processing node of which performance of the distributed processing of the job is to be requested, a processing node belonging to a group of processing nodes each having a processing result that is the same as a processing node in an information processing apparatus corresponding to the management node.

11. The distributed processing system according to claim 1, wherein the management node
requests processing including performance of the test processing by each processing node before requesting the distributed processing of the job by the processing node,
determines whether to adopt a processing result of the test processing that is received from a processing node of which the processing is requested, and
requests again, of a processing node whose processing result is determined to be adopted, processing requested of a processing node whose processing result is determined not to be adopted.

12. The distributed processing system according to claim 1, wherein the test processing is a processing that can be completed within a shorter time than the distributed processing of the job.

13. A method for a distributed processing system that performs distributed processing by a plurality of information processing apparatuses that are connected via a network, the plurality of information processing apparatuses including a management node that requests distributed processing of a job and processing nodes, each node of a subset of which is to execute the distributed processing of a unique part of the job and transmit a processing result to the management node, the method comprising:

requesting the processing nodes to perform test processing different from the distributed processing of the job;
grouping, based on processing results of the test processing received from the processing nodes, some of the processing nodes as a group of processing nodes from which performance of the distributed processing of the job is to be requested; and
requesting the group of processing nodes to perform the distributed processing of the job.

14. The method for a distributed processing system according to claim 13, wherein the grouping includes:
comparing the processing results of the test processing received from the processing nodes; and
grouping some of the processing nodes as a group of nodes based on a comparison result and not on a predetermined criterion.

15. An information processing apparatus that requests distributed processing of a job in a distributed processing system, which performs distributed processing by a plurality of information processing apparatuses connected via a network, the apparatus comprising:
a first requesting unit, which sends requests to the processing nodes to perform test processing different from the distributed processing of the job and to return processing results, wherein each node of a subset of the processing nodes is to execute the distributed processing of a unique part of the job;
a grouping unit, which groups processing nodes having identical processing results as a group of processing nodes of which performance of the distributed processing is to be requested; and
a second requesting unit, which sends requests to the group of processing nodes to perform the distributed processing of the job.

16. The information processing apparatus according to claim 15, wherein the grouping unit
compares the processing results of the test processing received from the processing nodes, and
groups some of the processing nodes as a group of nodes based on a comparison result and not on a predetermined criterion.

17. A method for an information processing apparatus that requests distributed processing of a job in a distributed processing system, which performs distributed processing by a plurality of information processing apparatuses connected via a network, the method comprising:
sending requests to the processing nodes to perform test processing different from the distributed processing of the job and to return processing results, wherein each node of the processing nodes is to perform distributed processing of a unique part of the job;
grouping processing nodes having identical processing results as a group of processing nodes of which performance of the distributed processing is to be requested; and
requesting the group of processing nodes to perform the distributed processing of the job.

18. The method for an information processing apparatus according to claim 17, wherein the grouping comprises:
comparing the processing results of the test processing received from the processing nodes, and
grouping some of the processing nodes from which performance of the distributed processing is to be requested based on a comparison result and not on a predetermined criterion.

19. A computer-readable storage medium storing program codes that when executed by a processor causes the processor to perform a method for an information processing apparatus that requests distributed processing of a job in a distributed processing system, which performs distributed processing by a plurality of information processing apparatuses connected via a network, the method comprising:

sending requests to the processing nodes to perform test processing different from the distributed processing of the job and to return processing results, wherein each node of the processing nodes is to execute the distributed processing of a unique of the job;

grouping processing nodes having identical processing results as a group of processing nodes of which performance of the distributed processing is to be requested; and requesting the group of processing nodes to perform the distributed processing of the job.

* * * * *